(12) United States Patent
Adler et al.

(10) Patent No.: US 9,074,852 B2
(45) Date of Patent: Jul. 7, 2015

(54) SURVEILLANCE IMAGE DENIAL VERIFICATION

(75) Inventors: Edward Allen Adler, Palos Verdes Estates, CA (US); Douglas Anthony Galasso, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 1325 days.

(21) Appl. No.: 11/938,659

(22) Filed: Nov. 12, 2007

(65) Prior Publication Data

US 2010/0283848 A1 Nov. 11, 2010

(51) Int. Cl.
| | |
|---|---|
| A62B 1/04 | (2006.01) |
| A61B 1/04 | (2006.01) |
| H04N 7/00 | (2011.01) |
| H04N 7/18 | (2006.01) |
| G02F 1/00 | (2006.01) |
| F21V 7/04 | (2006.01) |
| G08B 13/18 | (2006.01) |
| G01S 13/00 | (2006.01) |
| F41H 13/00 | (2006.01) |
| G01S 17/66 | (2006.01) |

(52) U.S. Cl.
CPC ............ *F41H 13/0056* (2013.01); *G01S 17/66* (2013.01)

(58) Field of Classification Search
USPC ............. 348/67, 68, 117, 119, 120, 144, 143, 348/297, 750, 758, 759
See application file for complete search history.

(56) References Cited

U.S. PATENT DOCUMENTS

| | | | |
|---|---|---|---|
| 5,752,126 A * | 5/1998 | Muramatsu | 399/44 |
| 5,978,653 A * | 11/1999 | Taylor et al. | 455/13.1 |
| 6,078,380 A * | 6/2000 | Taniguchi et al. | 355/52 |
| 6,139,157 A * | 10/2000 | Okuyuma | 353/102 |
| 6,480,140 B1 | 11/2002 | Rosefsky | |
| 6,707,052 B1 | 3/2004 | Wild et al. | |
| 7,035,308 B1 | 4/2006 | McNeil et al. | |
| 7,266,445 B1 * | 9/2007 | Janky et al. | 701/470 |
| 2002/0041328 A1 * | 4/2002 | LeCompte et al. | 348/144 |
| 2003/0083794 A1 | 5/2003 | Halm et al. | |
| 2003/0156046 A1 | 8/2003 | Dwyer et al. | |
| 2005/0024584 A1 * | 2/2005 | Persoff | 351/205 |
| 2005/0231690 A1 * | 10/2005 | Newell et al. | 353/20 |
| 2006/0000988 A1 | 1/2006 | Stuart et al. | |
| 2006/0289760 A1 * | 12/2006 | Bathiche | 250/332 |
| 2007/0239992 A1 * | 10/2007 | White et al. | 713/186 |
| 2009/0020002 A1 * | 1/2009 | Williams et al. | 89/41.03 |

OTHER PUBLICATIONS

William J. McCarthy, Captain, USN Directed Energy and Fleet Defense Implications for Naval Warfare, May 2000, Occasional Paper No. 10 Center for Strategy and Technology Air War College, pp. i-76.

* cited by examiner

*Primary Examiner* — Ninos Donabed
*Assistant Examiner* — Farrukh Hussain
(74) *Attorney, Agent, or Firm* — Haynes and Boone, LLP

(57) ABSTRACT

An assessment method and system for characterizing the operation of an imaging system are disclosed. The assessment system can comprise a light source configured to illuminate the imaging system, a modulator configured to modulate light from the light source, a receiver configured to intercept communications from the imaging system, and an analyzer configured to analyze the intercepted communications. The assessment system can be used to determine the effectiveness of an image denial system that is used to prevent a surveillance satellite from providing imagery and can thereby provide an advantage on the battlefield.

21 Claims, 5 Drawing Sheets

SURVEILLANCE IMAGE DENIAL VERIFICATION

TECHNICAL FIELD

The present disclosure relates generally to electro-optical countermeasures. The present disclosure relates more particularly to a system for characterizing an imaging system, such as a satellite surveillance imaging system. For example, an embodiment can be used to verify that a satellite surveillance image denial system is operating effectively.

BACKGROUND

Surveillance satellites are well known. Surveillance satellites are commonly used to provide tactical advantages to maneuver commanders in the battlefield. For example, surveillance satellites can provide images that show terrain, troop disbursements, convoys, and the location of artillery, missiles, aircraft and other equipment.

Electro-optical countermeasures for denying imaging capability to surveillance satellites are also known. Such countermeasures typically comprise directing a laser beam from a ground-based countermeasure system toward a surveillance satellite, so as to saturate the imaging detector(s) thereof and thus inhibit imaging.

Since the laser sources of such contemporary countermeasure systems are disposed at approximately sea level, the laser beam must pass through substantially the entire thickness of the Earth's atmosphere to reach the target satellite. As those skilled in the art will appreciate, the Earth's atmosphere attenuates and distorts a laser beam that passes therethrough. Such attenuation and distortion substantially inhibits the ability of the laser beam to adequately effect the desired countermeasure.

Because of the detrimental effects of the Earth's atmosphere upon such electro-optical countermeasure laser beams, a more powerful laser source is required. Less powerful ground-based laser sources are simply less effective at denying imaging capability to surveillance satellites. Thus, such ground-based laser sources must be larger, more complex, and more costly than desired.

The complexity of such larger laser sources inherently affects their reliability in an adverse manner. That is, such complex systems have more potential for failure, since there are comparatively more things that can go wrong. It is important to appreciate that the failure of a countermeasure system during a battle can cost lives.

Further, such ground based electro-optical countermeasure systems tend to be stationary. Because of the powerful laser sources required, the size of the equipment and the electrical power requirements thereof tend to make portability difficult. Portable electro-optical countermeasure systems must have portable power sources.

It is desirable to be able to characterize satellite surveillance systems. For example, such characterization can aid in the development and implementation of electro-optical countermeasure systems. It is also desirable to be able to verify in real time that such electro-optical counter measure system are operating effectively.

SUMMARY

Systems and methods are disclosed herein to provide an assessment system for characterizing the operation and/or structure of an imaging system. The assessment system can be used to characterize an imaging system such as an imaging system of a surveillance satellite. The assessment system can be used to monitor, measure, or otherwise characterize the normal operation or a disruption of the normal operation of an imaging system, such as an imaging system of a surveillance satellite.

For example, the assessment system can be used to determine if an image denial system is operating effectively to disrupt the operation of an imaging system of a surveillance satellite. In this manner, operation of the image denial system can be varied so as to assure effective operation thereof. Moreover, the use of such an assessment system can facilitate closed loop control of an image denial system.

According to an embodiment, the assessment system can comprise a light source configured to illuminate the imaging system, a modulator configured to modulate light from the light source, a receiver configured to intercept communications from the imaging system, and an analyzer configured to analyze the intercepted communications.

According to an embodiment, a method for characterizing the operation of an imaging system can comprise modulating light from a light source, illuminating the imaging system with the modulated light, intercepting communications from the imaging system, and analyzing the intercepted communications.

According to an embodiment, an assessment system for characterizing the operation of an imaging system can comprise means for modulating light from the light source, means for illuminating the imaging system with the modulated light, means for intercepting communications from the imaging system, and means for analyzing the intercepted communications.

Thus, an assessment system can be used to determine if an image denial system is operating effectively so as to inhibit operation of an imaging system of a surveillance satellite, for example. In this manner, tactical advantages can be obtained in a battlefield.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods mitigating the ability of an imaging system, such as that of a surveillance satellite, to obtain images are disclosed. Such image denial systems can provide a substantial advantage on the battlefield. One example of an image denial system is disclosed in U.S. patent application Ser. No. 10/990,202, filed on Nov. 16, 2004, and entitled SURVEILLANCE SATELLITE IMAGE DENIAL SYSTEM, the entire contents of which are hereby incorporated expressly by reference.

Systems and methods for characterizing the operation of an imaging system are also disclosed. Such systems can be used to assess the effectiveness of an image denial system.

Image Denial System

Figure 1:
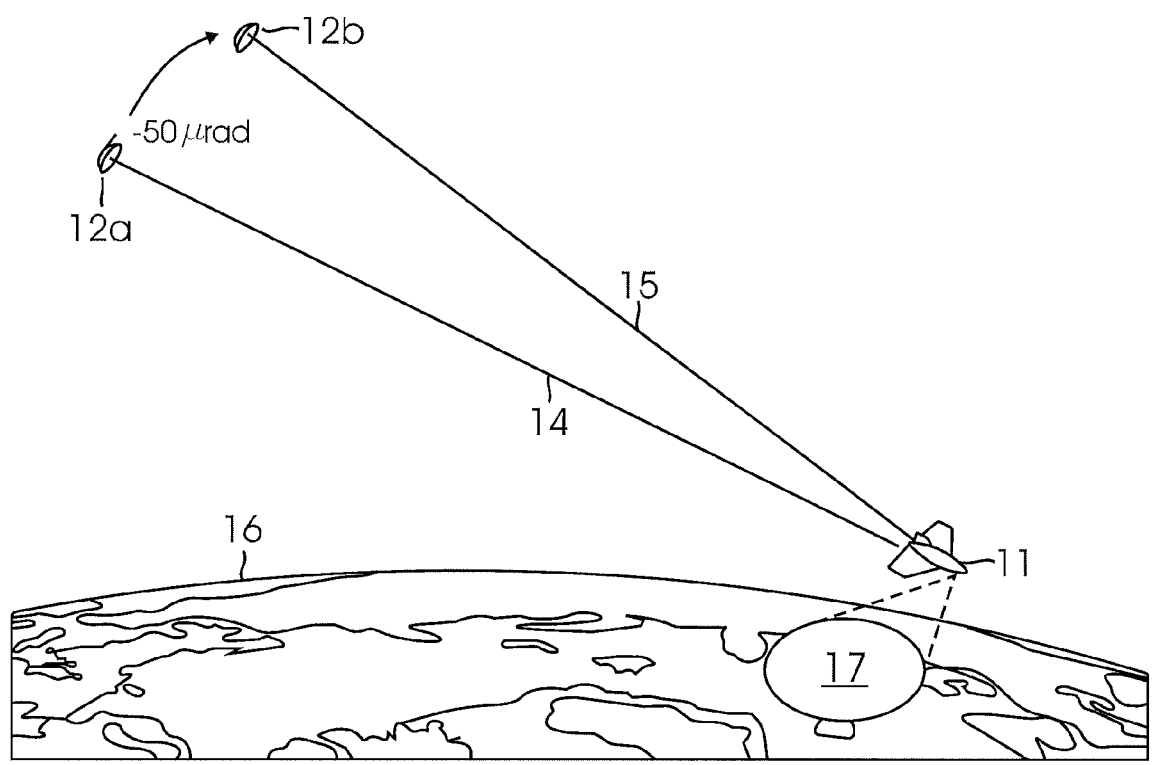
FIG. 1 is a diagram showing an airborne unmanned aerial vehicle (UAV) using a laser to deny imaging capability to a surveillance satellite according to an example of an embodiment.

FIG. 1 shows a surveillance satellite 12 at one position where it is labeled as 12a and also shows the same surveillance satellite 12 later in time, after it has moved to another position, where it is labeled as 12b. The surveillance satellite is designated generally, without concern for its position, as 12. It is designated more specifically, when its position is worthy of note, as 12a or 12b. The positions themselves may also be referred to as 12a and 12b and the distinction between the satellite and its positions will be clear from the context.

An unmanned aerial vehicle (UAV) 11 is airborne above the Earth 16. As discussed in detail below, a source of radiation, that can be a source of coherent radiation such as a laser source, can be used to temporarily blind surveillance satellite 12. That is, a laser beam 15 can be directed toward surveillance satellite 12, so as to overfill the aperture of one or more imaging devices thereof and thus prevent the imaging system of surveillance satellite 12 from collecting data in a limited area in the line of sight along a line drawn from the satellite through UAV 11 and on to the Earth 16 below. In this manner, imaging capability of surveillance satellite 12b is reversibly denied.

Reversibly denying imaging capability to a surveillance satellite denies the imaging capability in a manner that is not permanent. That is, once laser beam 15 is turned off, the surveillance satellite 12 can readily resume imaging, without any substantial lasting detrimental effects.

A radiation source is coupled to an airborne platform and is configured to direct an energy beam at the satellite sufficient to at least disrupt at least one surveillance function of the satellite. Typically, the energy beam will disrupt an imaging function of the satellite. However, the energy beam may disrupt other functions of the satellite, such as the function of a star tracker.

Because of the great distances and speeds involved, laser beam 15 must be fired so as to lead surveillance satellite 12 according to well known principles. For example, laser beam 15 can be fired approximately 50 microradians ahead of satellite 12 at the time that satellite 12 is at position 12a and is moving toward position 12b. That is, laser beam 15 can be fired toward position 12b instead of along line 14 toward position 12a. By the time that laser beam 15 reaches position 12b, satellite 12 also reaches position 12b, so that laser beam 15 hits satellite 12.

UAV 11 is one example of an airborne platform that can be used to transport a radiation source, such as a coherent light source, to an altitude that is above most of the Earth's atmosphere (e.g., an altitude of 15,000 to 25,000). Thus, UAV 11 can reach altitudes where the output from the coherent light source only needs to travel though approximately 20% of the Earth's atmosphere to reach its target.

The airborne platform can alternatively be an aircraft (such as an airplane or a helicopter), a balloon, or any other vehicle that is capable of traveling to such an altitude. The airborne platform can be either manned or unmanned.

Optionally, UAV 11 may additionally have a battle damage assessment (BDA) system, such as a BDA system that provides imagery or other assessment of a battlefield 17 that is located on the Earth 16, generally beneath UAV 11. The BDA may be a three-dimensional BDA. As a further option, UAV 11 may have an active designation system that illuminates targets within battlefield 17, such as with a laser, so as to facilitate the use of smart (laser guided) bombs and missiles against such targets.

Figure 2:
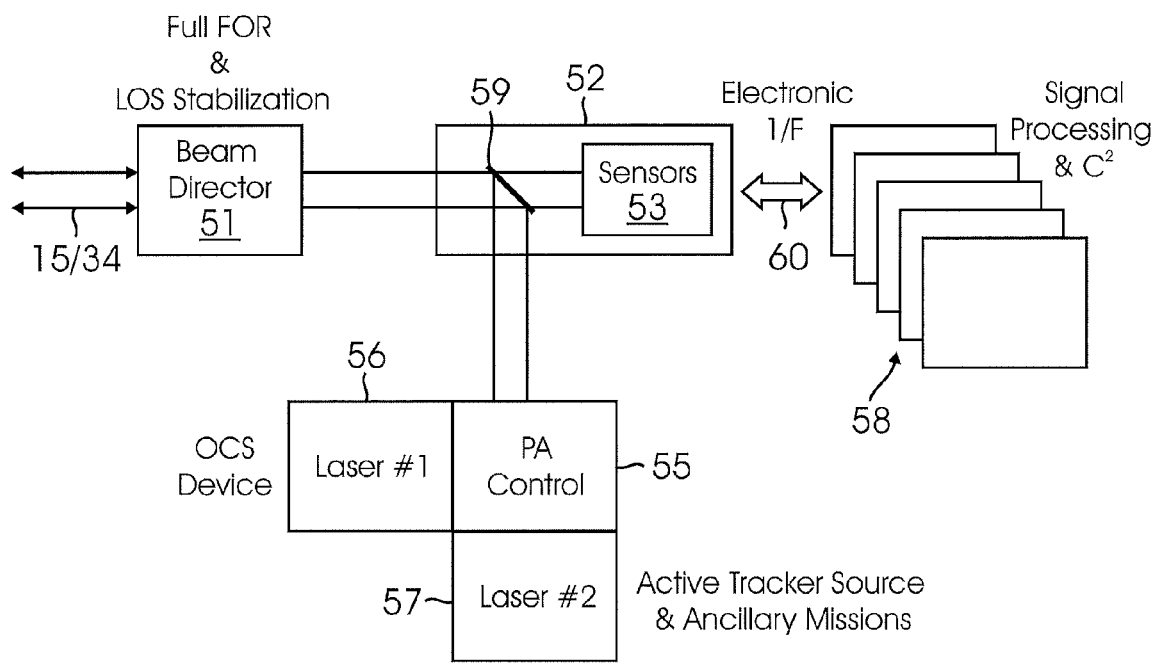
FIG. 2 shows a block diagram of the UAV-based surveillance satellite image denial system of FIG. 1.

FIG. 2 is an exemplary block diagram of an offensive countermeasure system (OCS) that is suitable for use in the UAV of FIG. 1. According to this embodiment, at least one laser provides an output to a point ahead control 55. For example, two lasers 56 and 57 can provide outputs to point ahead control 55. Point ahead control 55 effects leading of laser beam 14 according to well known principles. Two lasers 56 and 57, and point ahead control 55, cooperate to define an active tracer source. Alternatively, either a single laser or more than two lasers can be used. The two lasers 56 and 57 can both be used for image denial. Alternatively, one of the two lasers 56 and 57 can be used for image denial and the other can be used for ancillary missions, such as active target designation. Lasers 56 and 57 can have different frequencies.

Optionally, each laser 56 and 57 can have a dedicated beam director, so that each can function independently, such as for different missions (e.g., to simultaneously deny imaging to two different satellites or to facilitate simultaneous image denial and active target designation).

The output of point ahead control 55 is provided to a splitter/sensor assembly 52. Splitter/sensor assembly 52 comprises a beam splitter 59 that directs the outputs of lasers 56 and 57 to a beam director 51. Splitter/sensor assembly 53 also comprises a sensor assembly 53 which comprises one or more sensors, such as imaging sensors. At least one of the sensors of sensor assembly 53 facilitates optical augmentation for enhanced targeting, as described below.

The laser beam from beam splitter 59, is aimed by beam director 51, to provide output beam 15 that is directed toward position 12b of satellite 12, as discussed above. Beam director 51 can comprise a stable platform to enhance line of sight stabilization and/or field of regard, according to well known principles. Received reflected light 34 from at least one imager of satellite 12 can be directed by beam director 51 to splitter/sensor assembly 52, where it passes through splitter 59 and is incident upon sensor assembly 53.

An electronic interface 60 provides signals from sensor assembly 53 to a signal processing and $C^2$ (Command and Control) system 58. The signals are representative of the relative position of satellite 12 and the intensity of returned light 34. The signals can be used to facilitate optical augmentation.

UAV 11 can have an onboard targeting system comprising an acquisition system and a tracking system. The onboard targeting system can be defined by sensor assembly 53 and signal processing and $C^2$ system 58. Alternatively, the targeting system can be ground based or can be aboard another airborne or space-based platform.

The acquisition system acquires target surveillance satellite 12 according to well known principles. For example, target acquisition can be accomplished by active resolved or unresolved trackers, optical/imaging devices, and/or ephemeris data (along with local position and time).

Once the target is acquired, the acquisition system provides the approximate location of surveillance satellite 12 to the tracking system. The tracking system then tracks the movement of surveillance satellite 12 according to well known principles. For example, active or passive imaging devices can be used to track acquired target surveillance satellite 12.

Target surveillance satellite 12 can be acquired near the horizon and tracked using a closed-loop system at low bandwidth. Once surveillance satellite 12 is being tracked, one or more lasers can be used to effect temporary image denial. For example, when surveillance satellite 12 is above a zenith angle of approximately 70°, a laser source, such as laser 56, can deposit low flux, generally uniform, and coherent light upon at least one imaging sensor thereof, so as to overfill the aperture(s) of the surveillance satellite's sensor(s). Generally, laser 56 will continue to direct laser beam 14 toward surveillance satellite 12 until surveillance satellite 12 has completed its overhead pass.

The tracking system implemented by signal processing and $C^2$ system 58 provides aiming information to beam director 51. The tracking system updates the aiming information for the duration of the time for which image denial is desired.

A fire control system, defined by signal processing and $C^2$ system 58, provides a fire command to laser 56, for example, once the tracking system is successfully tracking target surveillance satellite 12 and for the duration of the time for which image denial is desired. For example, the fire control can activate laser 56 when surveillance satellite 12 is above a zenith angle of approximately 70°. The fire control can be responsive to commands from a ground-based or airborne human crew or can alternatively be responsive to commands from a computer controller that can be ground-based, airborne, or space-based. Such commands can designate targets, designate times of image denial, including provisions for deconflication, and/or designate autonomous operation of the image denial countermeasure system. Deconflication is a process whereby conflicts due to the presence of other satellites are avoided. For example, it may not be desirable to fire laser beam 15 when a nearby friendly satellite is likely to be adversely affected thereby.

An optional battle damage assessment (BDA) system, such as that defined by sensor assembly 53 and signal processing and $C^2$ system 58, provides battle damage assessment for battlefield 17. This assessment may include imagery, electromagnetic intercept, or any other desired type of assessment. For example, an imaging BDA system can be defined by beam director 51, splitter/sensor assembly 52 and signal processing and $C^2$ system 58.

An optional active designation system can illuminate prospective targets on battlefield 17, such as with a laser (which can be a different laser from the laser used to effect surveillance satellite image denial). In this manner, the use of smart bombs and smart missiles on battlefield 17 is better facilitated.

Optionally, closed-loop feedback control may be used to enhance tracking of surveillance satellite 12. Such closed-loop feedback control can be provided by the tracking system.

However, according to one embodiment of the present disclosure, such closed-loop feedback control can be provided or enhanced by sensing laser light that is reflected from one or more sensors of surveillance satellite 12.

Figure 3:
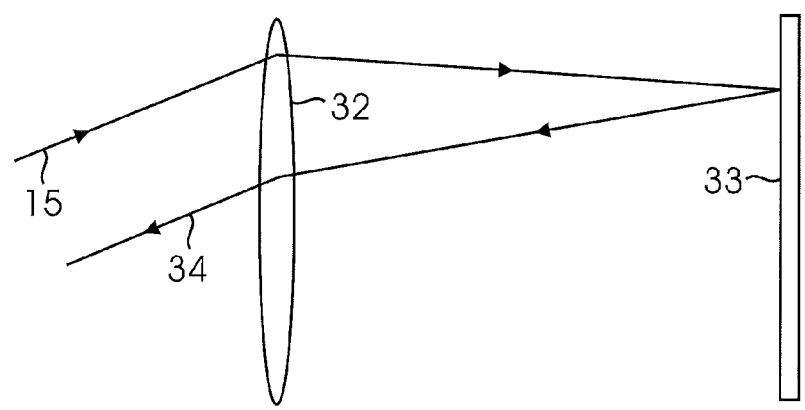
FIG. 3 shows laser light incident upon a sensor of a surveillance satellite so as to deny imaging capability and also shows light reflected from the sensor which can be used to enhance targeting of the surveillance satellite, according to an example of an embodiment.

FIG. 3 shows how an imaging sensor of a surveillance satellite reflects a portion of the light incident thereon, such that the reflected light can be used to provide closed-loop feedback control of the tracking system. Such reflection occurs much in the same manner that a cat's eye reflects light when a flashlight is shined thereon and is sometimes referred to as retro-reflection.

Laser beam 15 is directed to surveillance satellite 12 to effect image denial. Laser beam 15 is transmitted though lens 32 of an aperture for a sensor of surveillance satellite 12. Laser beam 15 is incident upon focal plane array 33 of the sensor, where it saturates the image sensing devices thereof to effect image denial.

Laser beam 15 is also reflected from focal plane array 33 to define a reflected light 34. At least some of reflected light 34 is transmitted back to UAV 11 (FIG. 1), where it can be used to effect closed-loop feedback control of the surveillance satellite tracking system. Thus, an imaging sensor of a surveillance satellite acts as a beacon or measurement source, which can be used for optical augmentation of the image denial laser beam 15. Such optical augmentation can be used to enhance aiming or tracking of the surveillance satellite 12.

The imaging sensors of surveillance satellites can be designed in a manner that tends to suppress such reflection of light therefrom. However, such suppression is not complete. A bidirectional reflectance distribution function of approximately $10^{-3}$ is not uncommon for light reflected from surveillance satellite sensors. Thus, sufficient light for optical augmentation is provided.

An on-axis (with respect to the optical axis of a surveillance satellite's optical system) laser source and collocated sensor can experience a greatly enhanced return, the optical cross section of which can be as much as six orders of magnitude greater than an off-axis return. Such magnitude is sufficient for very effective use in determining whether or not the laser source 31 is on-axis with respect to the sensor(s) of surveillance satellite 12. Indeed, the return is sufficient to facilitate complex measurements such as measurements regarding changes in both the target system and the atmosphere. Such measurements are impractical with land-based systems, where atmospheric absorption & turbulence effects are too great.

Monitoring of the reflected light 34 facilitates several types of measurement. For example, the delivered intensity of laser beam 15 can be estimated. Further, changes in the optical system of the target surveillance satellite can be observed. Monitoring of the reflected light also facilitates other functionalities, such as air-to-air wavefront correction and lethal infrared countermeasures.

Thus, the intensity of the reflected light 34 can be used for aiming and/or tracking. In this manner, the aiming of laser 56 can be fine tuned, to assure that laser beam 15 is approximately centered upon the optics of surveillance satellite 12, so as to enhance the image denial potential of laser beam 15.

Reflected light 34 can also be used to control maneuvering of UAV 11, such that UAV 11 tends to fly along a path that optimizes the ability of laser 56 to remain on-axis. Thus, if surveillance satellite 12 is attempting to image the northwest portion of battlefield 17, for example, then monitoring the reflected light 34 can cause UAV 11 to move to and/or remain in the northwest portion of battlefield 17, such that on-axis alignment of laser 56 with respect to the imaging sensor(s) of surveillance satellite 12 is maintained. Although the ability of UAV 11 to maneuver in this manner may be limited (such as due to the speeds and distances involved), any such maneuvering will nevertheless enhance the overall effectiveness of the system.

A Greenwood frequency ($f_G$) of less than approximately 100 Hz and an isoplanatic angle ($\theta_0$) of approximately 20 microradians facilitates real time sampling of the intensity of laser beam 34 that is reflected from the imaging sensor(s) of target surveillance satellite 12.

Thus, according to one aspect of the disclosure, an optional feedback system enhances the targeting of surveillance satellite 12. The optional feedback system comprise beam director 51 (FIG. 2), splitter/sensor assembly 52, and signal processing and $C^2$ system 58. Beam director 51 receives reflected light 34 from the imaging sensor of satellite 12. Sensor assembly 53 of splitter/sensor assembly 52 converts the reflected light into electrical signals representative of the position and intensity of reflected light 34. Signal processing and $C^2$ system 58 uses the electrical signals to determine if laser beam 15 is on-axis with respect to the optical imaging system of surveillance satellite 12. The intensity of reflected light 34 will be greatest when laser beam 15 is on-axis with respect to the optics of surveillance satellite 12.

The tracking system can control aiming of laser 56 and/or maneuvering of UAV 11. For example, tracking system can control aiming of laser 56 and/or maneuvering of UAV 11 so as to tend to maximize the intensity of reflected light 34 and thereby tend to maintain laser beam 15 on-axis with respect to the optics of surveillance satellite 12. Thus, the use of such optical feedback tends to enhance the ability of the present disclosure, according to at lease one aspect thereof, to precisely track surveillance satellite 12.

More particularly, as incident laser beam 15 becomes more off-axis, then the intensity of reflected light 34 is reduced substantially in power. Conversely, as incident laser beam 15 becomes more on-axis, then the intensity of reflected light 34 is increased substantially in power. The feedback system cooperates with tracking system so as to tend to maintain incident laser beam 15 on-axis with respect to the aperture of surveillance satellite 12.

As discussed above, feedback information may be used to modify the angle of incidence of the coherent radiation beam with respect to the surveillance satellite's imaging system, at least to some degree, by repositioning UAV 11. That is, if the UAV 11 is positioned at some portion of battlefield 17 that is not presently being imaged by the surveillance satellite, then the UAV 11 may be moved to that portion of battlefield 17 that is being imaged, such that the countermeasure laser beam 15 will be more on-axis with respect to the optical system of the surveillance satellites imaging sensor.

UAV 11 can alternatively remain in generally the same position and wait until surveillance satellite 12 re-orients its optical system so as to image that portion of the battlefield where UAV 11 is located. Such action would be appropriate when it is particularly desirable to deny imaging of that specific portion of battlefield 17 where UAV 12 is located.

Although laser light is discussed herein as the type of coherent radiation that is used to overfill the aperture of an imaging device of a surveillance satellite, those skilled in the art will appreciate that other types of coherent radiation may be used to reversibly deny or permanently deny imaging capability to a surveillance satellite. For example, x-ray radiation, microwave radiation, and/or other types of electromagnetic radiation may be used to effect image denial. Thus, the discussion herein of laser light as the type of coherent radiation used to deny imaging capability is by way of example only, and not by way of limitation.

One or more aspects of the present disclosure provide the capability to reversibly deny electro-optical sensors, such as space-based electro-optical sensors, the ability to provide images. Such image denial may be performed at times and locations that provide a tactical advantage. Tactical advantage may be provided by affording force protection and/or information overmatch at critical, potentially decisive, times during a conflict. Such image denial capability can prevent and/or delay an enemy's space-based reconnaissance efforts without inflicting physical harm on the space-based assets. In this manner, a military option is provided that is more likely to be politically acceptable than an alternative that results in physical harm to the enemy's space-base assets.

One or more aspects of the present disclosure facilitate the construction of an electro-optical countermeasures system using smaller, less costly laser sources. Indeed, the laser source of the present disclosure can be approximately one twentieth of the size of that of a ground-based countermeasure system having similar capabilities. Such reduction of size is advantageously accompanied by a corresponding reduction in cost for the airborne laser system and increased transportability and supportability. One or more aspects of the present disclosure further provide a portable electro-optical countermeasures system, to assure that satellite surveillance countermeasures can be implemented at the locations of battlefields worldwide. Additionally, at least one aspect of the present disclosure provides an airborne platform that is capable of wandering (moving) and that is also capable of looking down (to facilitate BDA and/or active target designation, for example).

Assessment System

An assessment system for characterizing the operation of an imaging system is disclosed. The assessment system can cooperate with the image denial system described above. According to an embodiment, the assessment system can comprise a radiation or light source, e.g., a coherent light source or laser, configured to illuminate the imaging system, a modulator configured to modulate light from the light source, a receiver configured to intercept communications from the imaging system, and an analyzer configured to analyze the intercepted communications.

For example, the light source can comprise a laser having between approximately 20 watts and approximately 50 watts of continuous wave (CW) power. The light source can provide light of insufficient power to damage the imaging system or even to disrupt operation of the imaging system. Alternatively, the light source can provide light of sufficient power to disrupt operation of the imaging system.

The modulator can be configured to modulate an intensity of the light. The intensity of the light can be modulated so as to saturate the imaging system of a surveillance satellite and thereby inhibit the surveillance satellite from obtaining images, such as images of a battlefield. The modulator can be configured to modulate an intensity of the light so as to cause a 10% modulation on a measured image value as determined from the intercepted communications.

If a saturation level of 100,000 photons per sample is assumed, which is typical for a charge coupled device (CCD) array, then a 10% modulation on the measured image can be provided with 20-50 watts of continuous wave laser power. This value can be measured as part of the telemetry communications from the satellite. Saturation of the imaging sensor can also be measured in the telemetry communications.

The modulator can be configured to modulate an intensity of the light with a pulse rate that is a multiple of a pixel sample rate or a frame rate of the imaging system. The modulator can be configured to modulate an intensity of the light at a plurality of different frequencies (frequency components) and the analyzer can be configured to convolve a component of the intercepted communications (that component of the intercepted communications that is representative of an image) with a modulation transfer function (MTF) of the imaging system.

Thus, one or more embodiments can be configured so as to effectively deny the imaging system of a surveillance satellite the ability to provide useful imagery. In order to effect such image denial, the light source can be configured to illuminate at least a portion of the satellite. Telemetry from the satellite is then intercepted and analyzed so as to determine the effectiveness of such illumination in inhibiting the surveillance satellite's ability to provide imagery.

Such analysis can be used to modify the light in a manner that makes it more effective in inhibiting the surveillance satellite's ability to provide imagery. For example, the intensity of a laser beam, the frequency of a laser beam, the percentage of the modulation, the frequency of the modulation, and/or any other parameter of the laser beam can be modified so as to enhance the ability thereof to disrupt the imaging system's ability to provide images. The intensity of a laser beam, the frequency of a laser beam, the percentage of the modulation, the frequency of the modulation, and/or any other parameter of the laser beam can be selected based upon knowledge of the imaging system.

However, rather than disrupting the ability of the imaging system to provide images, embodiments can be used to merely characterize the imaging system of a surveillance satellite. Characterizing the imaging system can include determining such information as the presence of filters in the optics system, the time required to change a filter or add a filter to the optics system, the time required to recover after saturation of an imager of the optics system, the response time of any automatic gain control circuitry, and the light gathering ability of the optics system. Such information may be useful in determining the nature or type of components used in the imaging system, as well as operational characteristic thereof. Such information may also be useful in developing and/or implementing effective countermeasures against the surveillance satellite. That is, embodiments can provide useful information about the structure and operation of a surveillance satellite without substantially modifying the operation of the surveillance satellite. In this manner, the imaging system of a surveillance satellite can be characterized without alerting the operator of the surveillance satellite that the surveillance satellite is being characterized.

The analyzer can be configured to analyze the intercepted communications by utilizing at least one parameter of the modulated light. For example, the modulation frequency of the laser can be used by the analyzer so as to better facilitate analysis of communications from the surveillance satellite.

Figure 4:
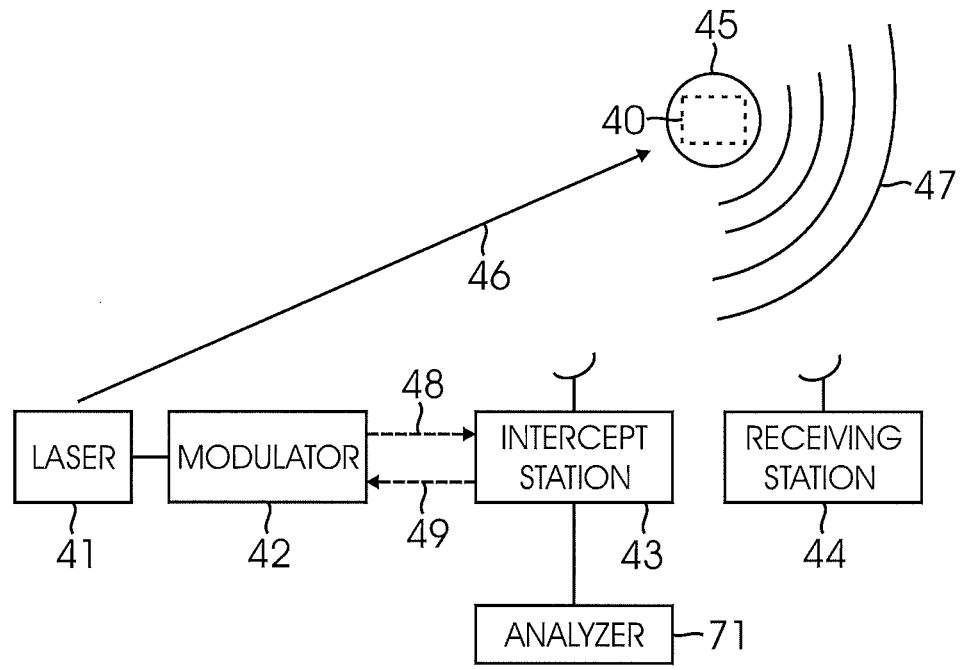
FIG. 4 shows a block diagram of an assessment system according to an example of an embodiment.

FIG. 4 shows an assessment system for characterizing an imaging system, such as an imaging system of a surveillance satellite. The assessment system can comprise a coherent light source, such as a laser 41. The laser 41 can be modulated by modulator 42 and can direct a laser beam 46 toward imaging system 40 of satellite 45.

As those skilled in the art will appreciate, the optical signal represented by the modulation of laser beam 46 will penetrate the electronics of imaging system 40. That is, an imaging sensor of imaging system 40 will detect this optical signal and convert the optical signal into an electronic signal. The electronic signal, or some modified indication of the electronic signal, may be present in the telemetry communications 47 of surveillance satellite 45.

The laser beam 46 can have insufficient power to inhibit or substantially affect the operation of imaging system 40. However, the laser beam 46 can have sufficient power to modify the operation of the imaging system 40 enough to vary the telemetry communications 47 transmitted by the satellite 45 to a receiving station 44.

Telemetry communications 47 can be intercepted by intercept station 43. Telemetry communications 47 can then be analyzed by analyzer 71 so as to characterize imaging system 40. Such characterization can be performed without damaging the imaging system 40, without substantially modifying the operation of the imaging system 40, and/or without being detected (such as by receiving station 44). That is, the power of the laser beam can be sufficiently low so as to permit substantially normal operation of the imaging system 40 that is being characterized.

Alternatively, the laser beam 46 can have sufficient power to inhibit or substantially affect the operation of imaging system 40 and have insufficient power to damage imaging system 40. Thus, laser beam 46 can provide image denial.

Intercept station 43 can receive information 48 representative of parameters of the laser beam 46, such as the time, intensity, frequency, and modulation thereof. These parameters can be used by an analyzer 71 to aid in the analysis of the telemetry communication 47.

Control information 49 can be provided to modulator 42 as the result of such analysis. Such control information can be used to modify the operation of modulator 42 and/or laser 41 so as to make laser beam 46 more effective at inhibiting the ability of imaging system 40 to provide imagery.

As discussed above, laser 41 can be disposed upon an airborne platform, such an unmanned aerial vehicle (UVA). Other elements of an embodiment can similarly be disposed upon an airborne platform. For example, modulator 42, intercept station 43, and/or analyzer can be disposed upon one or more airborne platforms.

Figure 5:
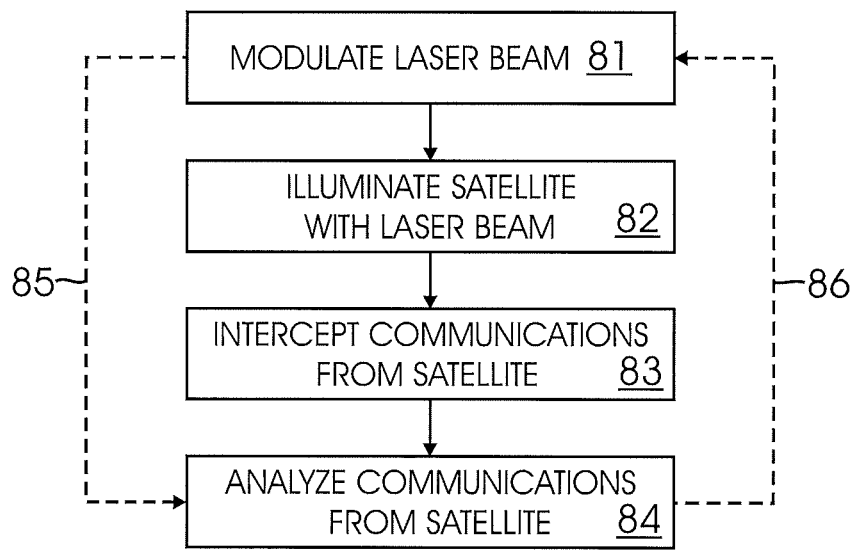
FIG. 5 shows a flow chart of the operation of an assessment system according to an example of an embodiment.

FIG. 5 shows the operation of the assessment system in a flow chart. A laser beam is modulated, as shown in block 81. The laser beam illuminates at least part of a satellite as shown in block 82. The laser beam illuminates at least the inlet aperture of the imaging system 40 (FIG. 4) of the satellite 45.

Telemetry communications from the satellite are intercepted as shown in block 83. The telemetry communications are analyzed, as shown in block 84. Such analysis can include looking for differences in the information contained in the telemetry between when the laser beam 46 is illuminating the satellite 45 and when it is not illuminating the satellite 45. The time that it takes for such communications to return to normal after illuminating the satellite 45 and after discontinuing illumination of the satellite 45 can be determined. The degree of changes in the information contained in the telemetry can be determined.

The intensity of the light can be modulated at a plurality of different frequencies. The analyzer can be configured to convolve a component of the intercepted communications with a modulation transfer function (MTF) of the imaging system. In this manner, the modulation frequency that has the greatest impact upon the imaging system 40 of the satellite 45 can be identified.

The satellite 45 can be illuminated by a tracker laser signal. Thus, light from the tracker signal that is reflected from the satellite 45 can be used to track the satellite 45. The tracker laser can optionally be the same laser 41 as that used to characterize the imaging system 40.

Light from the laser 41 that is used to characterize the imaging system 40 and/or light for the tracker laser can be used for optical augmentation beacon measurements, as discussed above. The results of such optical augmentation beacon measurements can be used to determine parameters of laser beam 46, such as the intensity thereof. For example, the results of such optical augmentation beacon measurements can be used to set the intensity of laser beam 46 such that laser beam 46 does not disrupt operation of the imaging system 40, does disrupt operation of the imaging system 40, or does not damage the imaging system 40.

Thus, light reflected from a satellite's imaging sensor or other component can be used to determine if the laser beam 46 is on target and is delivering the desired power to the imaging sensor. This reflected light can be used to control the intensity of the laser beam 46 such that disruption and/or damage to the imaging system 40 either occur or do not occur, as desired. In this manner, closed-loop control of the laser 41 can be provided. Close-loop control of the laser 41 can instead or can additionally be provided though the analysis of telemetry communications, as discussed herein. As those skilled in the art will appreciate, such closed loop control is preferable to derived or model open loop control.

Figure 6:
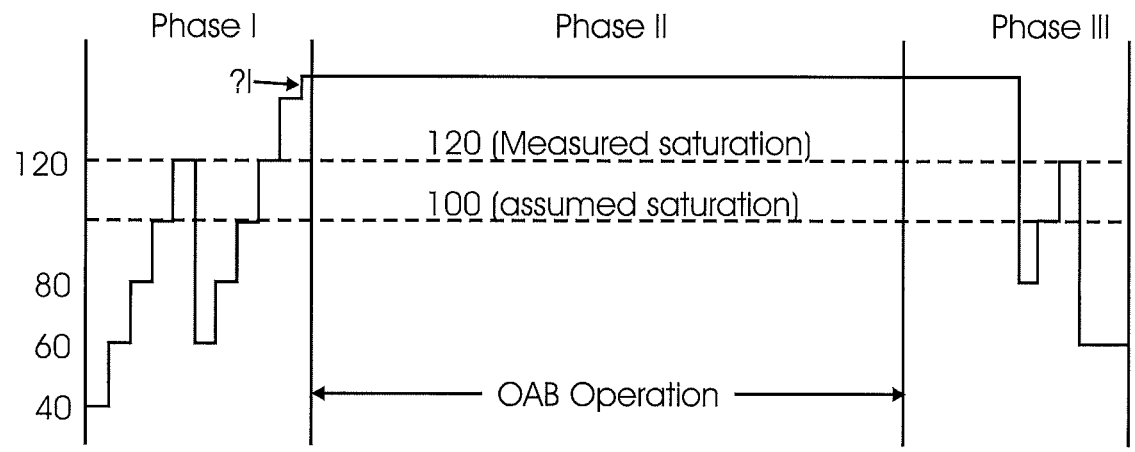
FIG. 6 shows intensity modulation of a laser beam according to an example of an embodiment.

FIG. 6 shows intensity modulation of a laser beam according to an example of an embodiment. During phase 1, the modulation can increase the intensity in a stairstep fashion up to or above the assumed saturation level of 100 (an arbitrary number for purposes of illustration only). The intensity can be modulated until actual saturation is achieved, such as at a level of 120, for example. Then, the intensity can be increased above the actual saturation level during Phase II. During Phase III, the intensity can be stairsteped up to the actual saturation level and the process can be repeated.

This modulation scheme facilitates monitoring of the actual saturation level and assures saturation during the image denial process. The image denial process can be enhanced via the use of an imaging sensor of a surveillance satellite as a beacon in an optical augmentation beacon (OAB) process as described herein. Other modulation schemes can alternatively be used.

Figure 7:
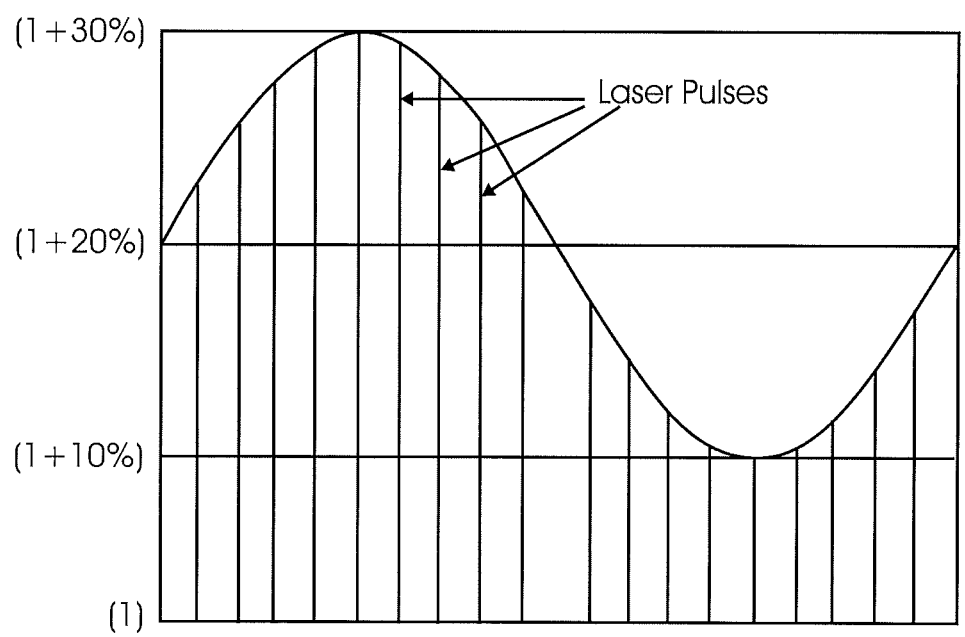
FIG. 7 shows a graph that illustrates a technique of intensity modulation of a primary source beam according to an example of an embodiment.

FIG. 7 shows an example of a technique for applying intensity modulation to the primary source beam, i.e., the laser beam that is being directed to the imaging system to effect characterization thereof and/or to effect image denial. The modulation intensity, as a percentage of the nominal intensity, of pulses of the laser beam is shown on the vertical axis and individual laser pulses are shown on the horizontal axis.

As show, the intensity can be varied from pulse to pulse. In this example, the intensity is varied from pulse to pulse so as to define a series of generally sinusoidal pulses. Other variations in intensity can similarly be used. For example, the intensity can be varied from pulse to pulse so as to define a series of sawtooth pulses, a series of square pulses, or a series of pulses having any other desired shape or combination of shapes.

Such modulation can inject a known intensity and frequency pattern into the imaging system's data stream, e.g., the image that is communicated via a satellite's downlink telemetry. By controlling the depth of modulation (such as by maintaining the intensity below the imaging system's saturation point and at a reasonable percentage of the pixel depth) and by controlling the frequency (such as by using a pulse to pulse variation beyond the focal plane array's clocking scheme), we can introduce a known Fourier series into the satellite's optical system and recover its as built modulation transfer function (MTF). By performing these measurements both pre and post image denial mission operations, we can refine our targeting knowledge and also verify that the imaging system has returned to nominal after ceasing image denial.

Figure 8:
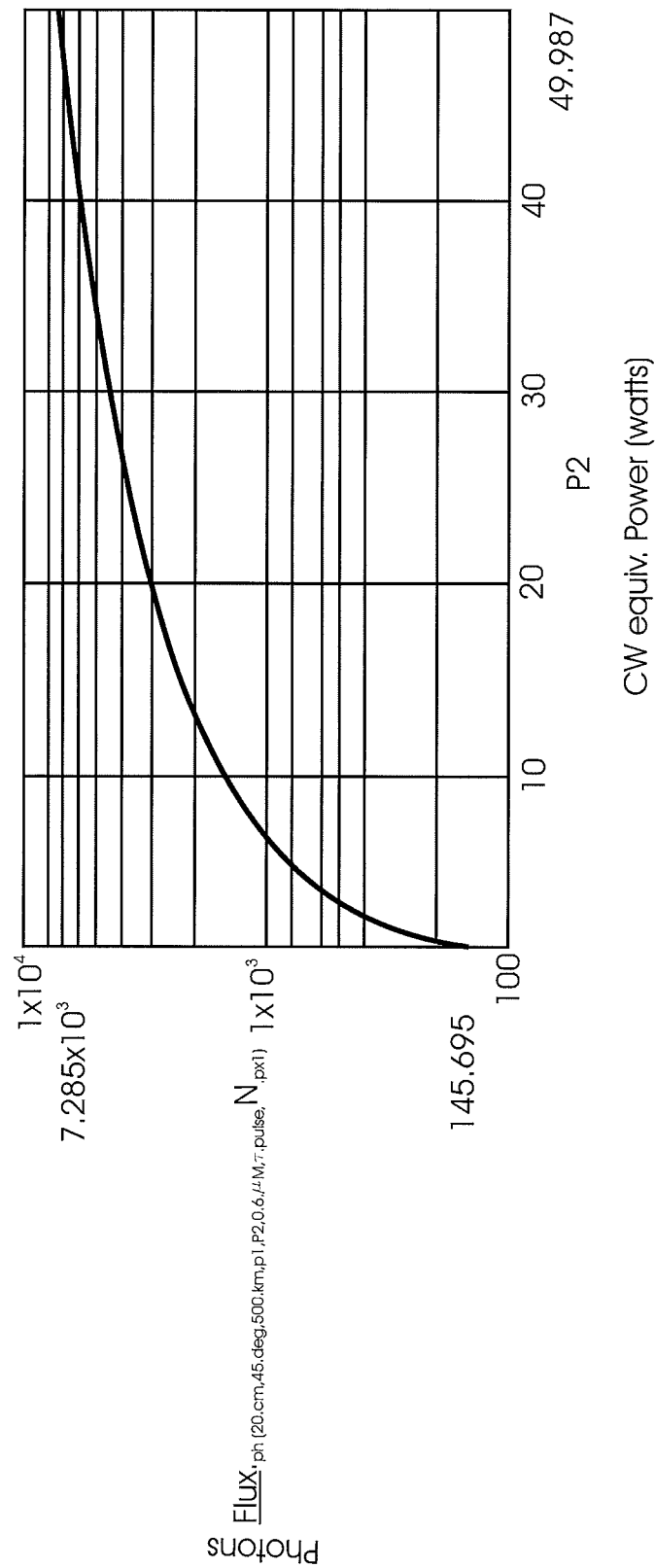
FIG. 8 shows a graph that illustrates the received photons as a function of projected laser power.

FIG. 8 shows a graph of received photons on the vertical axis versus projected laser power on the horizontal axis. For example, the graph can show the number of received photons at low Earth orbit (LEO).

A feature of an embodiment is the modulation of the intensity (amplitude) of the uplink laser beam in band that is within the normal operating frequency range of the imaging system. Assuming a saturation level of 100,000 photons/sample (which is typical for charge coupled device (CCD) arrays), it is easy to provide a 10% modulation on the measured image value by using a laser of only approximately 20-50 watts of continuous power.

Either a continuous laser or a series of pulses (from either a continuous laser or a pulsed laser) can be modulated and used according to one or more embodiments. Any desired combination of continuous lasers and pulsed lasers can be used.

Embodiments can be used to provide validation of mission effectiveness. Embodiments can also be used to confirm the reversibility of image denial.

Embodiments can be used to characterize and/or disrupt imaging systems such as those of satellites, aircraft, marine vessels, and the like. Indeed, embodiments can be used to characterize and/or disrupt imaging systems in general.

Embodiments described above illustrate but do not limit the disclosure. It should also be understood that numerous modifications and variations are possible in accordance with the principles of the present disclosure. Accordingly, the scope of the disclosure is defined only by the following claims.

We claim:

1. A countermeasure system, for use against a satellite imaging system configured to transmit telemetry communications comprising image data obtained using an imaging sensor, the countermeasure system comprising:
a laser light source configured to illuminate the imaging sensor of the satellite imaging system with laser light;
a modulator configured to modulate the laser light to inject a pattern into the image data generated during an operation of the satellite imaging system;
a telemetry receiver configured to intercept telemetry communications comprising the pattern-injected image data and transmitted from the satellite imaging system; and
an analyzer configured to analyze the pattern-injected image data in the intercepted telemetry communications to determine at least one characteristic of the satellite imaging system utilizing at least one parameter of the modulated laser light and/or to determine an effectiveness of the laser light source in inhibiting the operation of the satellite imaging system.

2. The countermeasure system as recited in claim 1, wherein the modulator is configured to modulate an intensity of the laser light in a manner that results in saturation of the imaging sensor by the laser light.

3. The countermeasure system as recited in claim 1, wherein the modulator is configured to modulate an intensity of the laser light so as to cause a 10% modulation on a measured image value as determined from the pattern-injected image data.

4. The countermeasure system as recited in claim 1, wherein the modulator is configured to modulate an intensity of the laser light with a pulse rate that is a multiple of a pixel sample rate or a frame rate of the satellite imaging system.

5. The countermeasure system as recited in claim 1, wherein the modulator is configured to modulate an intensity of the laser light at a plurality of different frequencies and the analyzer is configured to convolve the pattern-injected image data with a modulation transfer function (MTF) of the satellite imaging system.

6. The countermeasure system as recited in claim 1, wherein the laser light source is configured to overfill an aperture of the imaging sensor with the laser light to temporarily blind the satellite imaging system by saturating the imaging sensor without damaging the satellite imaging system.

7. The countermeasure system as recited in claim 1, wherein an intensity of the laser light source is insufficient to disrupt operation of the satellite imaging system.

8. The countermeasure system as recited in claim. 1, wherein an intensity of the laser light source is sufficient to disrupt operation of the satellite imaging system.

9. The countermeasure system as recited in claim 1, wherein an intensity of the laser light source is insufficient to damage the satellite imaging system.

10. The countermeasure system as recited in claim 1, wherein the laser light source is a first laser light source and the laser light is first laser light, the countermeasure system further comprising:
a second light source configured to illuminate the imaging sensor of the satellite imaging system with second laser light;
a light sensor configured to sense an intensity of the second laser light as reflected back by the imaging sensor of the satellite imaging system; and
a controller configured to:
monitor the intensity of the reflected second laser light, and
control, based on the intensity of the reflected second laser light, an intensity of the first and/or second laser light so as to temporarily blind the imaging sensor without damaging the satellite imaging system.

11. The countermeasure system as recited in claim 10, wherein the first and second laser light sources are a same laser light source.

12. A method, for use against a satellite imaging system configured to transmit telemetry communications comprising image data obtained using an imaging sensor, the method comprising:
illuminating the imaging sensor of the satellite imaging system with laser light using a laser light source;
modulating the laser light to inject a pattern into the image data generated during an operation of the satellite imaging system;
intercepting the telemetry communications comprising the pattern-injected image data and transmitted from the satellite imaging system; and
analyzing the pattern-injected image data in the intercepted telemetry communications to determine at least one characteristic of the satellite imaging system utilizing at least one parameter of the modulated laser light and/or to determine an effectiveness of the laser light source in inhibiting operation of the satellite imaging system.

13. The method as recited in claim 12, wherein the modulating the laser light comprises modulating an intensity of the laser light in a manner that results in saturation of the imaging sensor by the laser light.

14. The method as recited in claim 12, wherein the modulating the laser light comprises modulating an intensity of the laser light so as to cause a 10% modulation on a measured image value as determined from the pattern-injected image data.

15. The method as recited in claim 12, wherein the modulating the laser light comprises modulating an intensity of the laser light with a pulse rate that is a multiple of a pixel sample rate or a frame rate of the satellite imaging system.

16. The method as recited in claim 12, wherein the modulating the laser light comprises modulating an intensity of the laser light at a plurality of different frequencies, and wherein the analyzing the pattern-injected image data comprises convolving the pattern-injected image data with a modulation transfer function (MTF) of the satellite imaging system.

17. The method as recited in claim 12, wherein the illuminating the imaging sensor with the laser light light overfills an aperture of the imaging sensor of the satellite imaging system to temporarily blind the satellite imaging system by saturating the imaging sensor without damaging the satellite imaging system.

18. The method as recited in claim 12, wherein an intensity of the laser light source is insufficient to disrupt operation of the satellite imaging system.

19. The method as recited in claim 12, wherein an intensity of the laser light source is sufficient to disrupt operation of the satellite imaging system.

20. The method as recited in claim 12, wherein an intensity of the laser light source is insufficient to damage the satellite imaging system.

21. The method as recited in claim 12, wherein the laser light source is a first laser light source and the laser light is first laser light, the method further comprising:
illuminating the imaging sensor of the satellite imaging system with second laser light using a second laser light source;
sensing an intensity of the second laser light as reflected back by the imaging sensor of the satellite imaging system;
monitoring the intensity of the reflected second laser light; and
controlling, based on the intensity of the reflected second laser light, an intensity of the first and/or second laser light so as to temporarily blind the imaging sensor without damaging the satellite imaging system.

* * * * *